United States Patent
Pol et al.

(10) Patent No.: US 11,226,495 B2
(45) Date of Patent: Jan. 18, 2022

(54) SCREWLESS HINGES FOR EYEWEAR

(71) Applicants: Marchon Eyewear, Inc., Melville, NY (US); Nakanishi Optical Products Corp., Fukui (JP)

(72) Inventors: Alessandro Pol, Belluno (IT); Massimiliano Maccanti, Padua (IT); Nicole M. Troiano, Weehawken, NJ (US); Rachael N. Milluzzi, Brooklyn, NY (US); Keiichi Nakanishi, Fukui (JP); Masahide Nishida, Fukui (JP); Ken Yoshioka, Fukui (JP); Takashi Sawa, Fukui (JP)

(73) Assignees: Marchon Eyewear, Inc., Melville, NY (US); Nakanishi Optical Products Corp., Fukui (JP)

( * ) Notice: Subject to any disclaimer, the term of this patent is extended or adjusted under 35 U.S.C. 154(b) by 37 days.

(21) Appl. No.: 16/773,173

(22) Filed: Jan. 27, 2020

(65) Prior Publication Data

US 2020/0241319 A1 Jul. 30, 2020

Related U.S. Application Data

(60) Provisional application No. 62/797,738, filed on Jan. 28, 2019.

(51) Int. Cl.
*G02C 5/22* (2006.01)

(52) U.S. Cl.
CPC ......... *G02C 5/2272* (2013.01); *G02C 5/2209* (2013.01)

(58) Field of Classification Search
CPC ...... G02C 5/22; G02C 5/2209; G02C 5/2218; G02C 5/2254; G02C 5/2272
USPC ............................................ 351/153; 16/228
See application file for complete search history.

(56) References Cited

U.S. PATENT DOCUMENTS

| | | | | |
|---|---|---|---|---|
| 3,145,254 A | * | 8/1964 | McCulloch | G02C 5/2209 351/153 |
| 5,583,588 A | * | 12/1996 | Chao | G02C 5/008 16/228 |
| 9,482,878 B2 | | 11/2016 | Chan | |
| 2012/0224137 A1 | | 9/2012 | Li | |
| 2013/0239366 A1 | | 9/2013 | Kim | |

FOREIGN PATENT DOCUMENTS

| | | |
|---|---|---|
| CA | 2917254 | 8/2016 |
| CN | 201015014 Y | 1/2008 |
| CN | 201107479 Y | 8/2008 |
| CN | 201107480 Y | 8/2008 |
| CN | 201107481 Y | 8/2008 |
| CN | 201138401 Y | 10/2008 |
| CN | 201222125 Y | 4/2009 |
| CN | 201654349 U | 11/2010 |
| CN | 201673330 U | 12/2010 |

(Continued)

*Primary Examiner* — Darryl J Collins
(74) *Attorney, Agent, or Firm* — Brient IP Law, LLC

(57) ABSTRACT

A screwless hinge system for connecting a temple to a front frame portion of eyewear includes a hooked tab with a single hook and a base. The hooked tab extends through the front frame portion and a u-spring until the base engages the frame. A temple receiver of a temple compresses the u-spring and engages the single hook, allowing for opening and closing of the temple and removal and replacement of the temple without tools.

20 Claims, 13 Drawing Sheets

(56) References Cited

FOREIGN PATENT DOCUMENTS

| | | |
|---|---|---|
| CN | 202008555 U | 10/2011 |
| CN | 202102180 U | 1/2012 |
| CN | 202119988 U | 1/2012 |
| CN | 202119995 U | 1/2012 |
| CN | 202600272 U | 12/2012 |
| CN | 202929302 U | 5/2013 |
| CN | 103955073 A | 7/2014 |
| CN | 203838431 U | 9/2014 |
| CN | 204422890 | 6/2015 |
| DE | 20 2011 051 139 U | 1/2012 |
| DE | 202011051142 | 1/2012 |
| EP | 2 645 153 A2 | 10/2013 |
| EP | 2963481 A1 | 1/2016 |
| EP | 3 054 340 A1 | 8/2016 |
| EP | 2 645 153 B1 | 9/2018 |
| FR | 3 023 385 | 7/2014 |
| HK | 1200647 A2 | 8/2015 |
| IT | 102016000055530 | 11/2017 |
| JP | 3171795 U | 10/2011 |
| JP | 3171796 U | 10/2011 |
| KR | 20120056940 A | 6/2012 |
| KR | 101175034 B1 | 8/2012 |
| KR | 2130057124 A | 5/2013 |
| KR | 101315601 B1 | 10/2013 |
| TW | M416103 U1 | 11/2011 |
| TW | M416104 U1 | 11/2011 |
| WO | 2012070907 A2 | 5/2012 |

\* cited by examiner

SCREWLESS HINGES FOR EYEWEAR

CROSS-REFERENCE TO RELATED APPLICATIONS

This application claims the benefit of U.S. Provisional Patent Application No. 62/797,738, filed on Jan. 28, 2019, and entitled "SCREWLESS HINGES FOR EYEWEAR," the contents of which are hereby incorporated by reference herein.

BACKGROUND

Eyewear typically includes two temples rotationally coupled to a front frame portion that supports the lenses for the eyewear. The temples are rotatable between a first position that is substantially parallel with the front frame portion for stowage and a second position that is substantially perpendicular to the front frame portion for wearing. The temples are rotationally coupled to the front frame portion via hinges. Conventional hinges include a plate or leaf attached to the front frame portion and a leaf attached to the temple, with each leaf having complimentary barrel sections that mate together to create a rotatable joint that is secured with a screw or pin that is inserted through the length of the barrel.

Conventional hinges that use a screw require users to have a specialized tool (e.g., a small screwdriver) to remove the temple from the frame. Because of the required tool that may not be available or readily accessible when needed, removing one or more temples is difficult or cumbersome. Consequently, replacing a damaged temple or changing temples for fashion or aesthetic purposes is difficult.

Consequently, there is a need for improved eyewear hinge systems that allow for the rotational coupling of temples to the front frame portion of eyewear, while providing for simplified removal and replacement of the temples without tools. Various embodiments of the screwless hinge system described herein recognize and address the foregoing considerations, and others, of prior art devices.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure, a screwless hinge for operatively connecting a temple to a front frame portion of eyewear is provided. The screwless hinge includes a hooked tab and a u-spring. The hooked tab is configured for insertion through a hinge aperture of the front frame portion of the eyewear to an installed configuration. The hooked tab includes a single hook with a hook opening that is facing outward away from a bridge of the front frame portion in the installed configuration. The single hook and hook opening are configured to receive a span of a temple receiver of the temple to couple the temple to the front frame portion while allowing for rotation of the temple around the span. The hooked tab additionally includes a base that is sized to prevent passage through the hinge aperture and to engage a front surface of the front frame portion in the installed configuration. The u-spring has a substantially U shape with an opening that is facing the outward direction in the installed configuration. The u-spring also has two apertures positioned to receive the hooked tab and allow for the single hook to project at least partially through in the installed configuration.

According to another aspect of the disclosure, a screwless hinge system for operatively connecting a temple to a front frame portion of eyewear is provided. The screwless hinge includes a hooked tab, a u-spring, and a temple receiver of the temple. The hooked tab is configured for insertion through a hinge aperture of the front frame portion of the eyewear to an installed configuration. The hooked tab includes a single hook with a hook opening that is facing outward away from a bridge of the front frame portion in the installed configuration. The single hook and hook opening are configured to receive a span of a temple receiver of the temple to couple the temple to the front frame portion while allowing for rotation of the temple around the span. The hooked tab additionally includes a base that is sized to prevent passage through the hinge aperture and to engage a front surface of the front frame portion in the installed configuration. The u-spring has a substantially U shape with an opening that is facing the outward direction in the installed configuration. The u-spring also has two apertures positioned to receive the hooked tab and allow for the single hook to project at least partially through in the installed configuration. The temple receiver of the temple includes a pair of temple receiver sides, the span extending between the temple sides and configured to engage the single hook, and at least one rotation stop projecting away from a top surface of a temple receiver side and configured to prevent rotation of the temples in a direction normal to the rotation of the temple around the hooked tab.

According to yet another aspect, a screwless hinge system for operatively connecting a temple to a front frame portion of eyewear is provided. The screwless hinge includes a hooked tab, a u-spring, and a temple receiver of the temple. The hooked tab is configured for insertion through a hinge aperture of the front frame portion of the eyewear to an installed configuration. The hooked tab includes a single hook with a hook opening. The single hook and hook opening are configured to receive a span of a temple receiver of the temple to couple the temple to the front frame portion while allowing for rotation of the temple around the span. The hooked tab additionally includes a base that is sized to prevent passage through the hinge aperture and to engage a front surface of the front frame portion in the installed configuration. The u-spring has a substantially U shape and two apertures positioned to receive the hooked tab and allow for the single hook to project at least partially through in the installed configuration. The temple receiver of the temple includes a pair of temple receiver sides, the span extending between the temple sides and configured to engage the single hook, and at least one rotation stop projecting away from a top surface of a temple receiver side and configured to prevent rotation of the temples in a direction normal to the rotation of the temple around the hooked tab. The temple receiver is configured such that when the temple is positioned in an open position, the u-spring is substantially uncompressed and when the temple is positioned in a closed configuration, the u-spring is at least partially compressed.

BRIEF DESCRIPTION OF THE DRAWINGS

Various embodiments of the invention will be described below. In the course of the description, reference will be made to the accompanying drawings, which are not necessarily drawn to scale, and wherein.

DETAILED DESCRIPTION OF VARIOUS EMBODIMENTS

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As stated above, eyewear typically includes two temples rotationally coupled to a front frame portion utilizing a hinge that requires a screw or pin to be removed and installed for removal and installation of the temples. As temples or hinges get damaged, tools must be acquired and used to replace the damaged components. Because eyewear provides a wearer with fashion opportunities, multiple pairs of eyewear must conventionally be purchased to alter the aesthetic characteristics of the eyewear and the corresponding wearer. Have multiple pairs of eyewear for fashion purposes can be costly.

Utilizing the concepts and techniques described herein, a screwless hinge provides a rotatable connection between the temples and the frame of eyewear, while allowing for quick and easy removal and replacement of the temple without the use of tools. For the purposes of this disclosure, "eyewear" will refer to any glasses, prescription or non-prescription, having a front frame portion and two temples rotatably coupled to the front frame portion. Similar to conventional hinges, the screwless hinge shown and described herein holds the temples in both open and closed configurations and allows for a smooth rotatable transition between open and closed configurations. However, a user may remove each temple with a straightforward process in which the temple is pressed downward and outward to remove the temple from the screwless hinge. A similar process of pressing the temple downward and inward into the screwless hinge replaces the temple or another desired temple. By allowing for rapid and straightforward removal and replacement of temples without tools, the concepts described herein provide a user to replace damaged temples easily, or to possess multiple sets of temples having various aesthetic features for interchanging at will according to desired fashion choices at any particular moment.

Figure 1A:
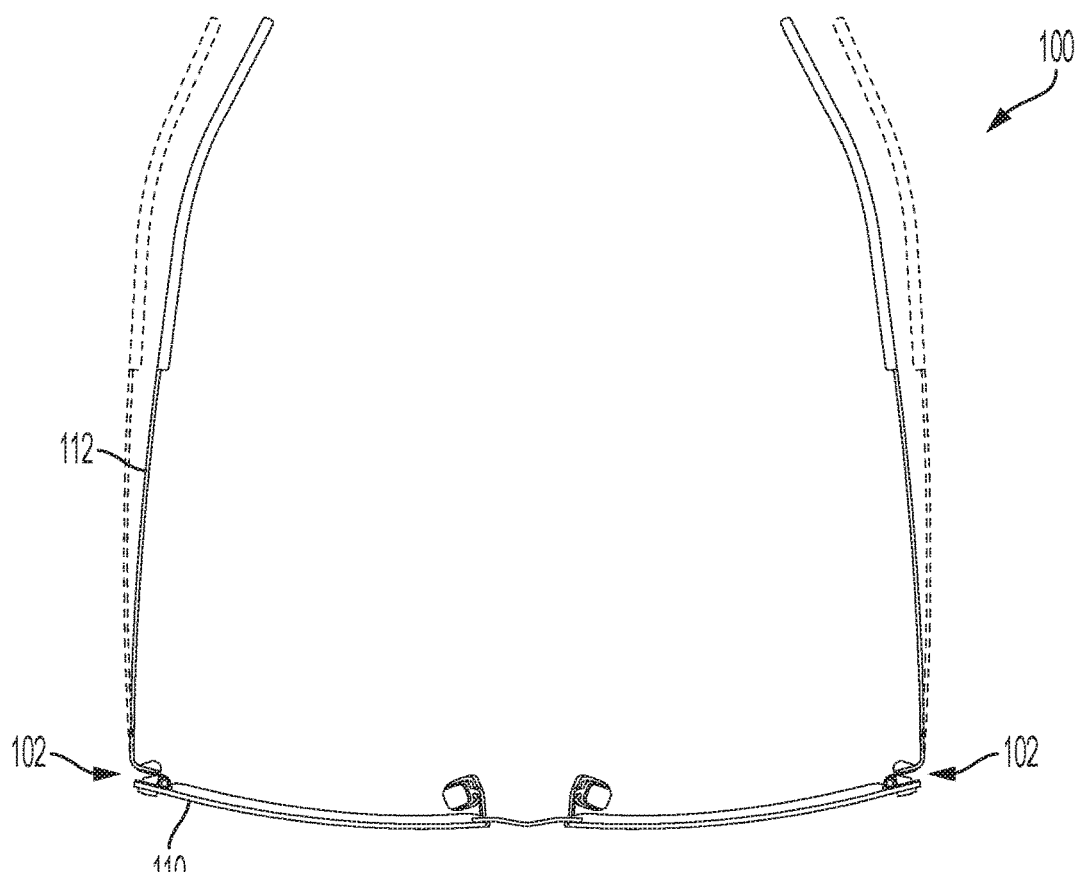
FIGS. 1A-1C are top, front, and side views, respectively, of eyewear having a screwless hinge according to various embodiments described below.
Figure 1B:
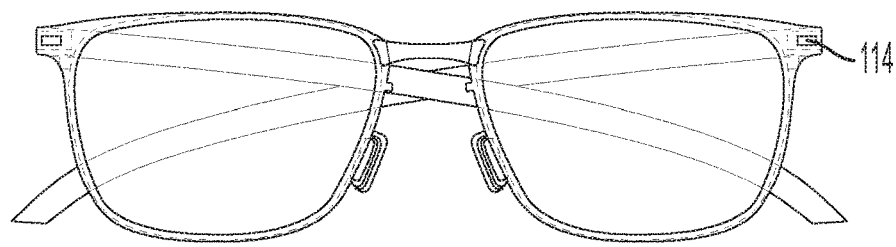
Figure 1C:
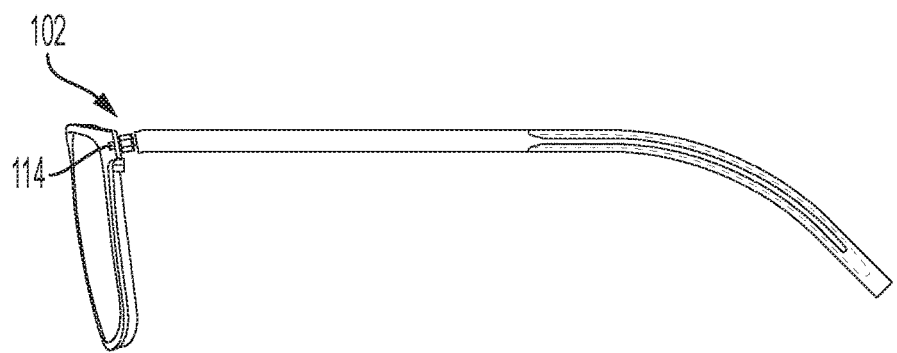

Turning to FIGS. 1A-1C, top, front, and side views, respectively, of eyewear having a screwless hinge 102 are shown according to one embodiment. The various components of the screwless hinge 102 are shown in the enlarged view of FIG. 3A. FIGS. 2A-2C and 3B show aspects of an alternative embodiment. This alternative embodiment will be described below after first discussing the various components of a screwless hinge system with respect to the first embodiment. According to the first embodiment shown in FIGS. 1A-1C and 3A, the screwless hinge 102 includes a hooked tab 104 and a leaf spring or u-spring 106 that are removably coupled to the front frame portion 110 of the eyewear that supports the lenses. The hooked tab 104 and u-spring 106 engage a temple receiver 108 on an end of a temple 112 to rotatably secure the temple 112 to the front frame portion 110 of the eyewear.

Figure 3A:
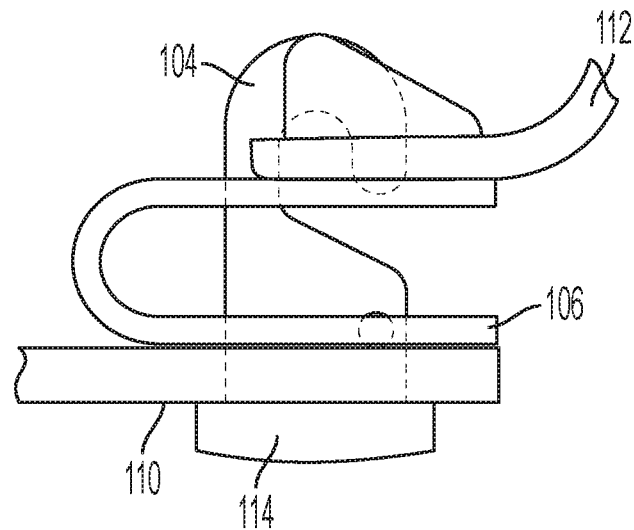
FIG. 3A is an enlarged view of a screwless hinge of the eyewear of FIGS. 1A-1C according to various embodiments described below.

According to one embodiment, the front frame portion 110 of the eyewear includes a hinge aperture at each opposing end at the locations of the screwless hinges 102. The hooked tab 104 is configured to be inserted through the hinge aperture from a front side of the eyewear such that the hook of the hooked tab 104 extends from a rear side of the front frame portion 110 and a base 114 of the hooked tab 104 that is larger than the hinge aperture engages the front surface of the front frame portion 110 to prevent the hooked tab 104 from passing through the hinge aperture. This positioning of the hooked tab 104 and the engagement of the base 114 of the hooked tab 104 with the front surface of the front frame portion 110 is best shown in FIG. 3A.

It should be appreciated that the base 114 of the hooked tab 104 may be colored, patterned, or otherwise finished according to any desired look for the user. The screwless hinges 102 described herein not only allow for quick and easy replacement of a broken temple 112, but also for the customization of eyewear through changing temples 112 and/or hooked tabs 104 according to a desired appearance. According to various embodiments, a number of hooked tabs 104 having bases 114 of varying colors, patterns, and/or finishes may be used with a singe pair of eyewear. The interchangeable hooked tabs 104 may allow the user to customize the eyewear as desired. Similarly, a number of temples 112 of varying colors, patterns, and/or finishes may be quickly and easily swapped using the screwless hinges 102 described herein to customize the appearance of the eyewear.

Figure 4A:
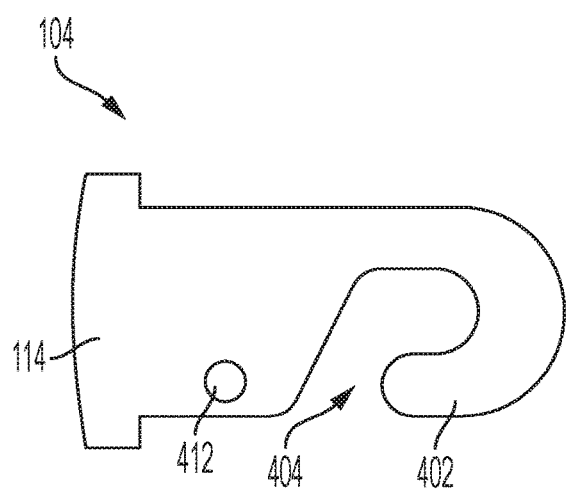
FIG. 4A is a side view of a hooked tab of a screwless hinge of the eyewear of FIGS. 1A-1C according to various embodiments described below.

FIG. 4A shows an example of a hooked tab 104 according to the embodiments shown in FIGS. 1A-1C and 3A. The hooked tab 104 has a base 114, a single hook 402, and a hook opening 404 that allows the temple receiver of the temple 112 to be pushed within for engagement with the single hook 402. Although the hooked tab 104 may include multiple hooks without departing from the scope of this disclosure, embodiments described herein utilize a single hook 402 per hooked tab 104. A single hook 402 is compact, facilitates engagement with the temple 112 as only a single hook mates with the temple receiver, and requires less material, complexity, and associated cost to manufacture. The hooked tab 104 may additionally include a mechanism that assists in holding the hooked tab 104 in place in an installed configuration when the temple 112 is removed. In the example shown in FIG. 4A, this mechanism is a hooked tab retention mechanism 412. The hooked tab retention mechanism 412 will be described in greater detail below.

Figure 4B:
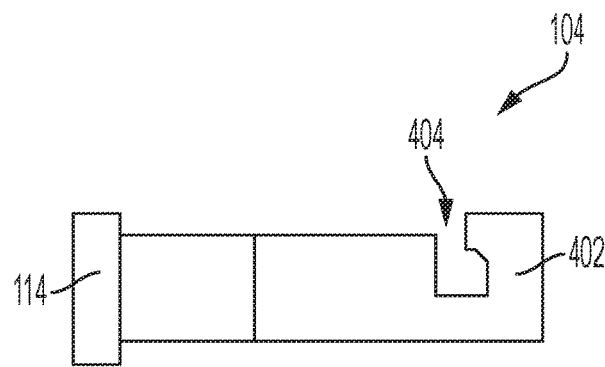
FIG. 4B is a side view of a hooked tab of a screwless hinge of the eyewear of FIGS. 2A-2C according to various embodiments described below.
Figure 4C:
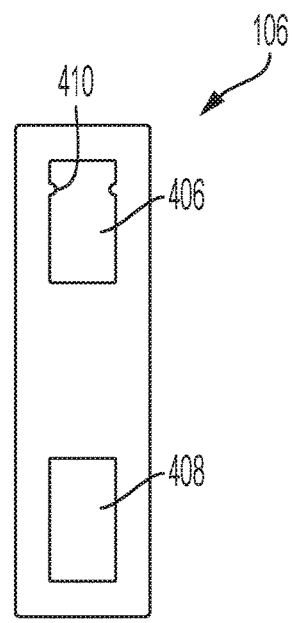
FIG. 4C is a top view of a u-spring of a screwless hinge in a pre-bent configuration according to various embodiments described below.
Figure 4D:
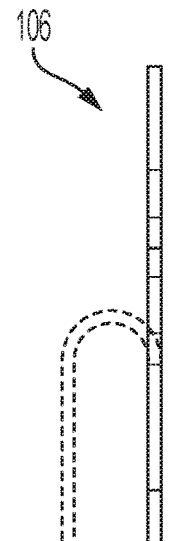
FIG. 4D is a side view of the u-spring of FIG. 4C showing the transition between the pre-bent and bent configurations according to various embodiments described below.

FIG. 4C shows a top view of a u-spring 106 in a pre-bent configuration. The u-spring 106 may be made from a flat piece of material with two u-spring apertures that is bent into the desired shape, such as a substantially U shape, as shown in the side view of FIG. 4D. The broken lines in FIG. 4D illustrates the bent configuration after the flat piece of material having first and second u-spring apertures 406 and 408, respectively, is bent into the final shape of the u-spring 106. To bend the u-spring 106 into the final shape, heat may be applied and/or mechanical force depending on the material used to create the u-spring 106. The u-spring 106 may include any material with desired elasticity and other characteristics that allows for the spring to be manually compressed, while providing a sufficient force to press the temple receiver 108 upward against the hook of the hooked tab 104, as described in greater detail below.

The first and second u-spring apertures 406 and 408, respectively, are sized and shaped to receive the hooked tab 104 therethrough when the u-spring 106 is bent into the U shape for use in the screwless hinge. Specifically, after the hooked tab 104 is inserted through the hinge aperture of the front frame portion 110 until the base 114 of the hooked tab 104 is seated against the front surface of the front frame portion 110, the u-spring 106 is fit over the hooked tab 104 such that the hooked tab 104 extends through the two apertures of the u-spring 106 to create the installed configuration of the screwless hinge.

As discussed briefly above, according to one embodiment, a retention mechanism may be used to hold the hooked tab 104 and the u-spring 106 in place in the installed configuration with the front frame portion 110 of the eyewear when the temple 112 is not installed. Holding the screwless hinge in place without the temple 112 is advantageous when removing and replacing the temple 112. The user may remove the temple 112, place the temple in a stowed location and retrieve a replacement temple, and do so without concern for holding the screwless hinge in place or otherwise preventing the hooked tab 104 from falling out of the hinge aperture in the front frame portion 110 of the eyewear.

Figure 6:
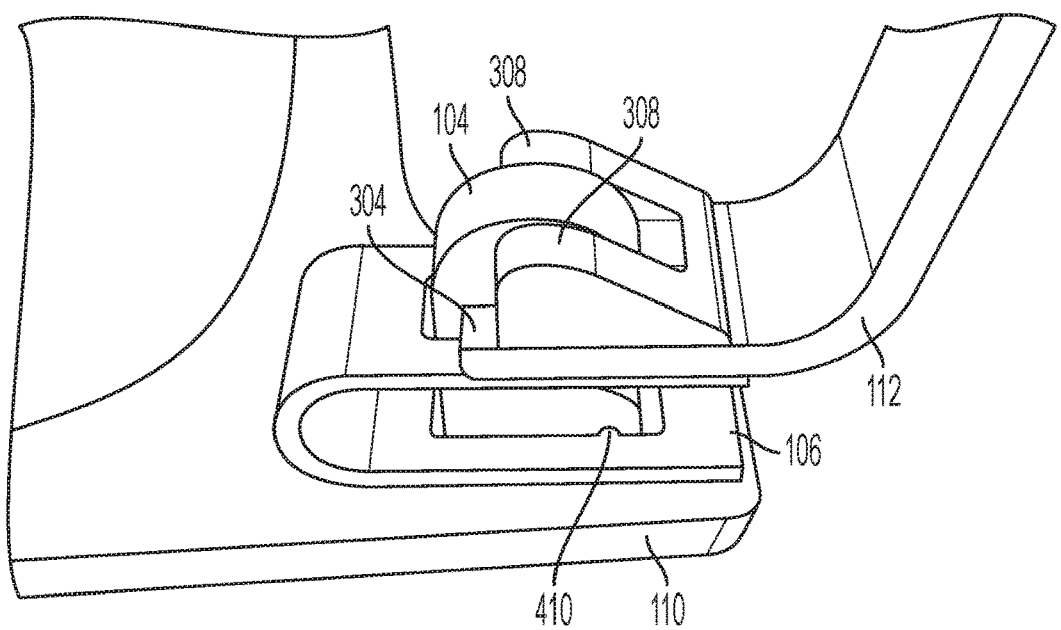
FIG. 6 is an enlarged perspective view of a screwless hinge according to various embodiments described below.

According to one embodiment, the retention mechanism includes the hooked tab retention mechanism 412 of the hooked tab 104 and a complimentary spring retention mechanism 410 of the u-spring 106. The hooked tab retention mechanism 412 may include an aperture positioned and sized to receive the spring retention mechanism 410 of the u-spring 106. The spring retention mechanism 410 includes one or more projections into the first u-spring aperture 406 that are sized to frictionally engage the hooked tab 104 as the u-spring 106 is slid onto the hooked tab 104. When the u-spring 106 is properly seated onto the hooked tab 104 and against a rear surface of the front frame portion 110 of the eyewear, the projections of the spring retention mechanism 410 are received within the aperture of the hooked tab retention mechanism 412. This engagement holds the u-spring 106 in place, which additionally prevents the hooked tab 104 from exiting back through the hinge aperture of the front frame portion 110. The spring retention mechanism 410 and hooked tab retention mechanism 412 are shown coupled together in the installed configuration in FIGS. 6 and 7. It should be appreciated that any other means for maintaining the installed configuration with the u-spring 106 in place over the hooked tab 104 may be utilized without departing from the scope of this disclosure.

Figure 5A:
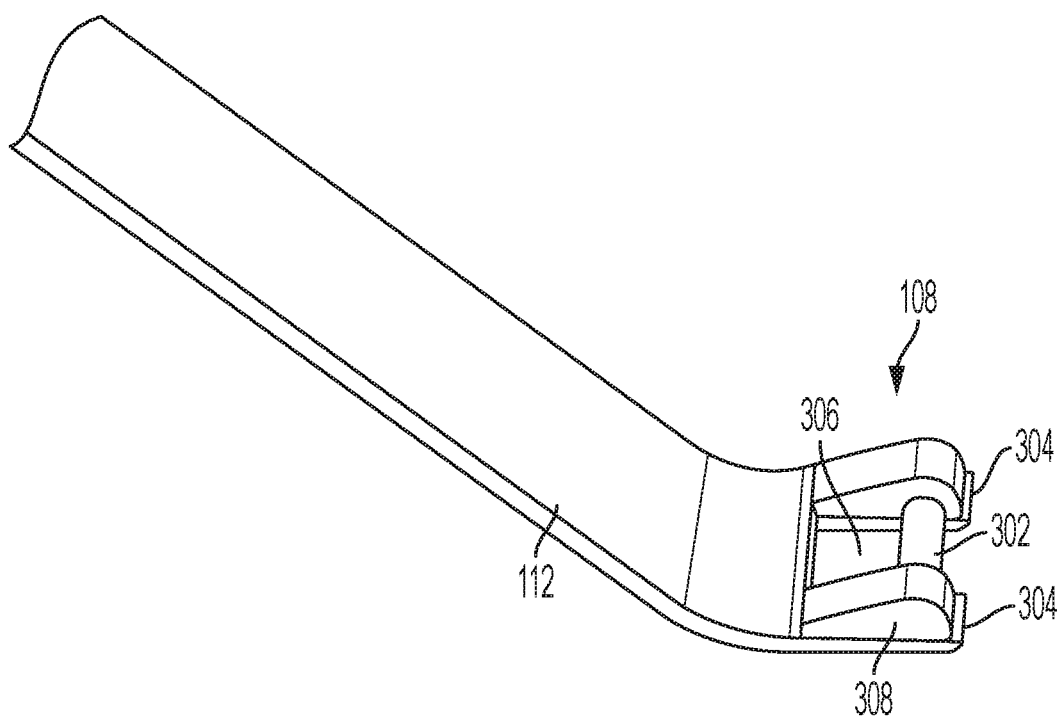
FIG. 5A is an inside perspective view of a temple receiver according to various embodiments described below.
Figure 5B:
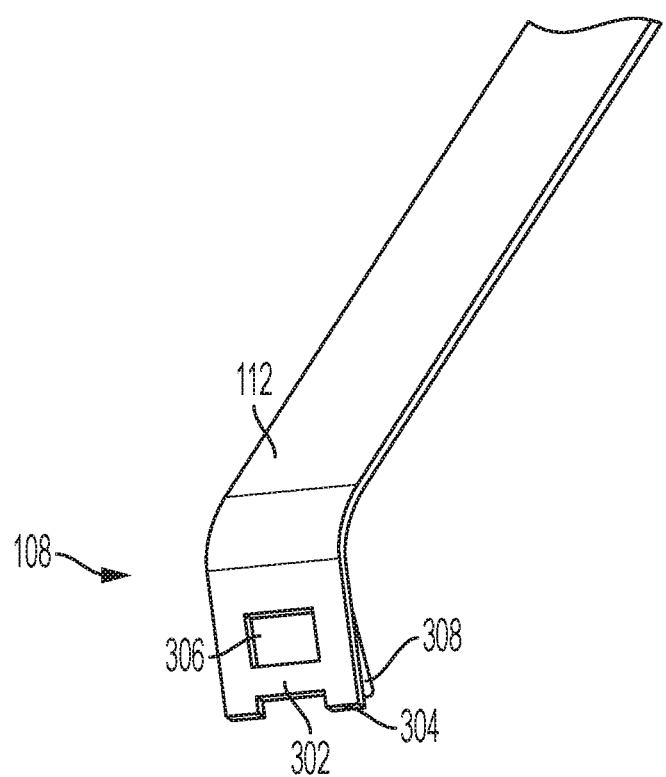
FIG. 5B is an outside perspective view of the temple receiver of FIG. 5A according to various embodiments described below.

Turning now to FIGS. 5A and 5B, features of the temple 112 and corresponding temple receiver 108 will be described. FIGS. 5A and 5B show front and rear perspective views, respectively, of a temple 112 and temple receiver 108. The temple receiver 108 is an end portion of the temple 112 that engages and disengages the screwless hinge. The various features of the temple receiver 108 described herein interact with the u-spring 106 and hooked tab 104 to create a screwless hinge system. According to various embodiments, the temple receiver 108 includes a span 302 or link that connects temple receiver sides 304 of the temple receiver 108, creating a temple aperture 306 therebetween. According to the example shown, the temple receiver sides 304 are parallel to one another, but non-parallel sides may be used without departing from the scope of this disclosure.

The temple receiver 108 further includes one or more rotation stops 308 projecting away from a top surface of at least one of the temple receiver sides 304. As will be discussed in greater detail below with respect to FIG. 14, the rotation stops 308 are configured to prevent movement in the up and down direction (i.e., upward toward the top of the page and a top of the front frame portion 110 and downward toward a bottom of the page and a bottom of the front frame portion 110 as seen in FIG. 1C) to maintain the pantoscopic angle of the eyewear. Another way of describing this functionality of the rotation stops 308 is that the rotation stops 308 are configured to prevent rotation of the temples 112 in a direction normal to the rotation of the temples 112 around the screwless hinges 102. The rotation stops 308 abut the single hook 402 when the temple 112 is configured in the open configuration, providing stability and preventing rotation in the direction that is normal to the primary rotation direction of the temple 112 around the hooked tab 104. Secondarily, the rotation stops 308 may engage the u-spring 106 when the temple 112 is in a closed configuration.

The span 302 may have any shape and dimensions, but is configured to engage the single hook 402. As will become clear from the description of FIGS. 13 and 14 below, the span 302 may be positioned at a location along the length and height of the temple receiver 108 that provides a dimensional relationship between a linear distance between contact locations of the single hook 402 and span 302 with a linear distance between the contact locations between the temple receiver 108 and the u-spring 106 when the temple 112 is in the open and closed configurations. This dimensional relationship allows the screwless hinge to bias the temple position to the open configuration to facilitate opening the temples 112 of the eyewear for use. The span 302 may extend directly between the temple receiver sides 304, separate from the rotation stops 308, or may alternatively be partially or wholly coupled to at least a portion of the rotation stops 308.

The process for removing and replacing the temple 112 will be described in greater detail below with respect to FIGS. 8-11, but generally the temple receiver 108 is pressed downward against the u-spring 106 until the span 302 of the temple receiver 108 is able to be inserted into the hook opening 404 of the hooked tab 104 with the end of the single hook 402 positioned in or through the temple aperture 306. When the user releases pressure from the temple 112, the force from the u-spring 106 presses the temple receiver 108 into the single hook 402 of the hooked tab 104, coupling the temple 112 to the front frame portion 110 while allowing rotation between open and closed configurations.

Figure 2A:
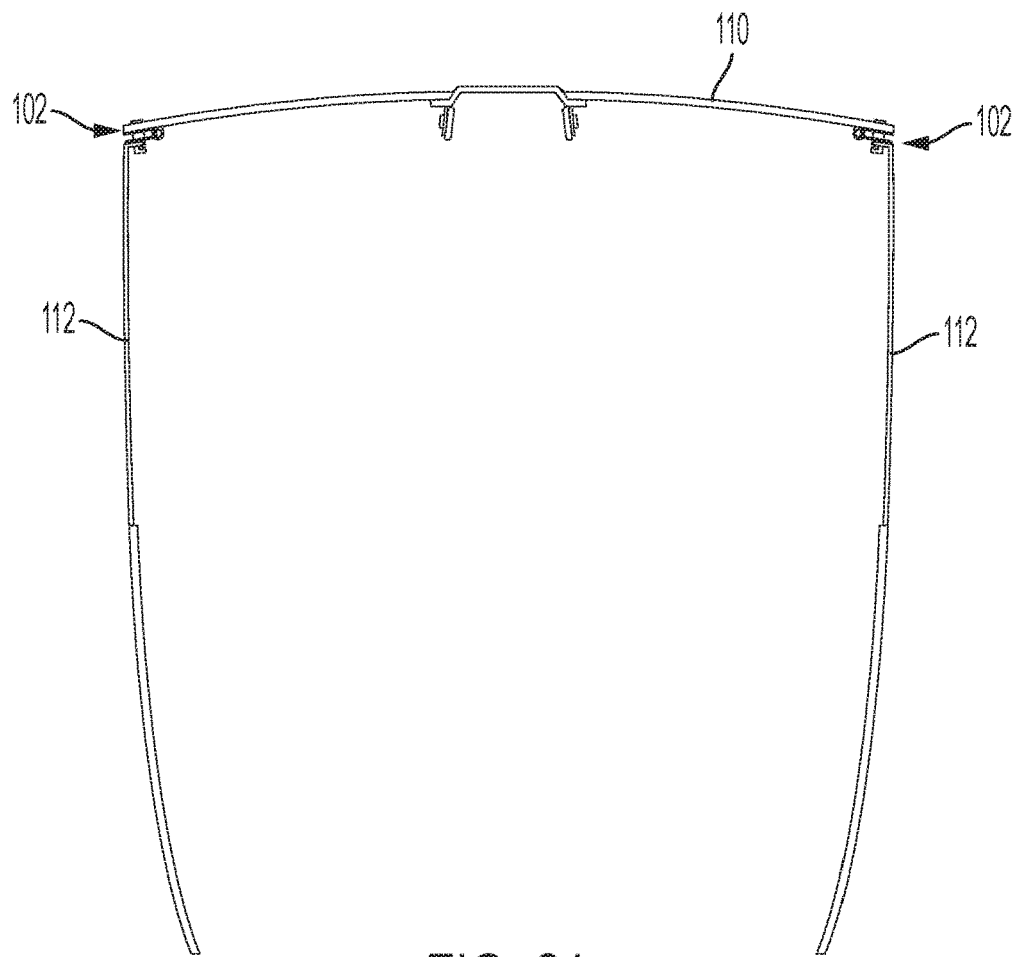
FIGS. 2A-2C are top, front, and side views, respectively, of eyewear having a screwless hinge according to various alternative embodiments described below.
Figure 2B:
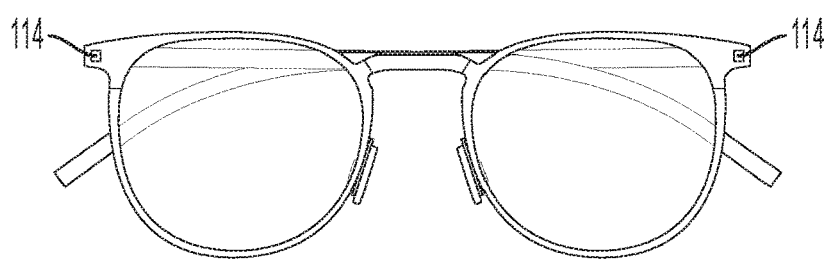
Figure 2C:
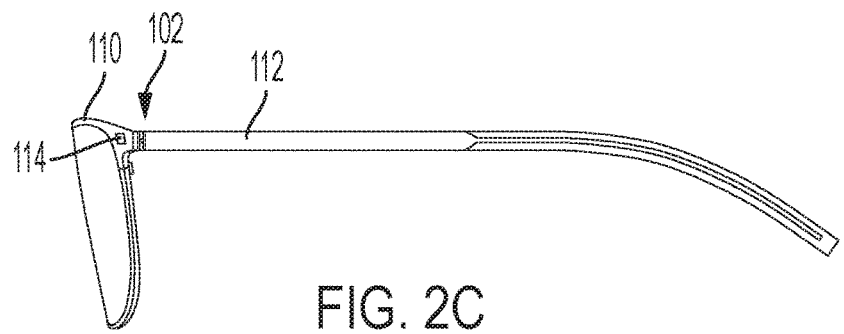

Returning to FIGS. 1A-1C, as described above, the embodiment shown is configured such that the open portion of the u-spring 106 is facing outward toward the edge of the front frame portion 110. In other words, the u-spring 106 is facing an outward direction away from a bridge of the front frame portion 110 in the installed configuration. Similarly, the hook opening 404 of the single hook 402 of the hooked tab 104 is also facing outward. In contrast, FIGS. 2A-2C show an alternative embodiment in which the hook opening 404 of the single hook 402 of the hooked tab 104 is facing inward towards the bridge or center of the front frame portion 110 of the eyewear with the u-spring 106 opening facing outwards. In this alternative configuration, the single hook 402 of the hooked tab 104 extends through the temple aperture 306 when the span 302 of the temple receiver 108 is engaged within the single hook 402 and the u-spring 106 provides a force against the temple receiver 108 to maintain the temple receiver 108 within the hook opening 404 and rotatably coupling the temple 112 to the front frame portion 110.

Figure 3B:
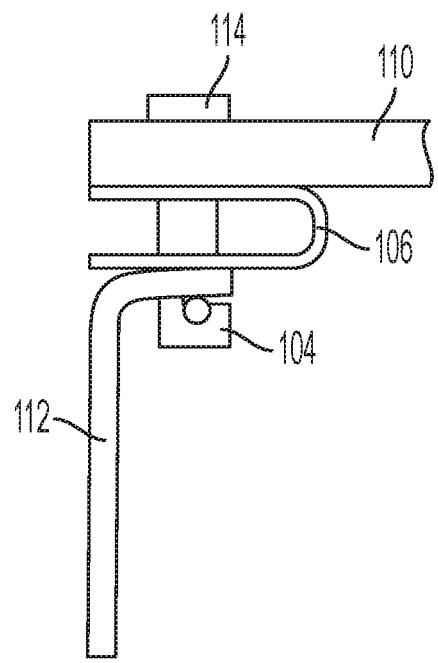
FIG. 3B is an enlarged view of a screwless hinge of the eyewear of FIGS. 2A-2C according to various embodiments described below.

Examples of the screwless hinges having different configurations according to the two described embodiments can be seen and compared in FIGS. 3A and 3B. FIG. 3A shows an enlarged view of a screwless hinge of the eyewear of FIGS. 1A-1C with the hook opening 404 and u-spring 106 opening facing outwards, while FIG. 3B shows an enlarged view of a screwless hinge of the eyewear of FIGS. 2A-2C with the hook opening 404 facing inward and u-spring 106 opening facing outwards. FIG. 4B shows a hooked tab 104 according to the alternative embodiment of FIGS. 2A-2C and 3B. The hooked tab 104 of FIG. 4B is similar to that described above, but may be sized according to a smaller form factor to facilitate passage through the temple aperture 306 of the temple receiver 108. In this alternative embodiment, the temple aperture 306 may be sized and shaped to have a relatively larger opening to accommodate the hooked tab 104 passing through, as well as the rotation of the hooked tab 104 within the temple aperture 306 during opening and closing of the temples 112. It should be noted that when the hooked tab 104 extends through the temple aperture 306 in this alternative embodiment, the end of the single hook 402 is not positioned within the temple aperture 306 and does not rotate through the temple aperture 306 when the temple 112 transitions between open and closed configurations.

It should be understood that the u-spring 106 and the hooked tab 104 may be configured in any orientation that allows the temple receiver to press downward against the u-spring 106 and engage the hooked tab 104 for coupling. However, the first described embodiment of FIGS. 1A-1C and 3A in which the hook opening 404 and u-spring 106 opening are both facing outward provides advantages over the alternative embodiment in which the hook opening 404 is facing inward. For example, the process for replacing and removing the temple 112 is simplified when the hooked tab 104 does not need to extend through the temple aperture 306 of the temple receiver 108. As shown and described below, in the first described embodiment, the temple receiver 108 may be used to apply pressure to compress the u-spring 106 without precisely threading the hooked tab 104 through the temple aperture 306 during replacement. Moreover, upon removal of the temple 112, in the first described embodiment, the temple receiver 108 may be used to apply pressure to compress the u-spring 106 and pulled directly outward to remove the span 302 from the hook opening 404, without requiring compression and then manipulation in multiple directions to remove the span 302 from the hook opening 404 while simultaneously removing the hooked tab 104 from the temple aperture 306. Consequently, the remainder of this disclosure will be directed to the first described embodiment in which the hook opening 404 and u-spring 106 opening are both facing outward, as shown in FIGS. 1A-1C and 3A.

Figure 7:
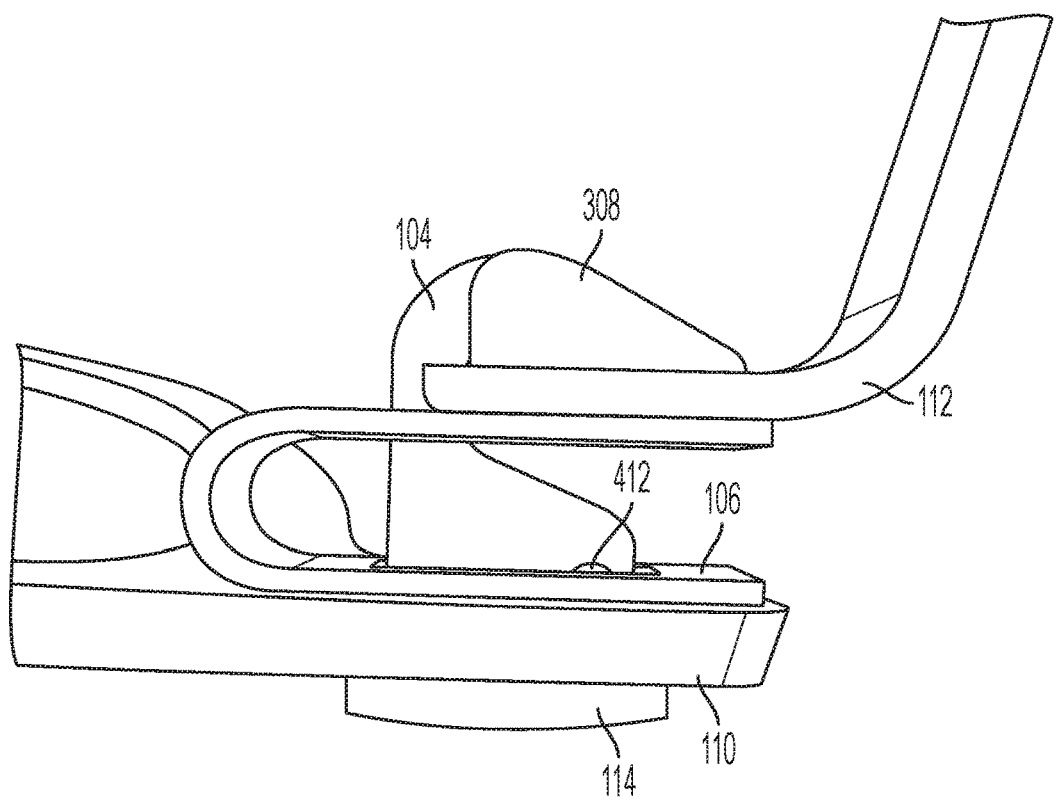
FIG. 7 is an enlarged view of the screwless hinge of FIG. 6 according to various embodiments described below.
Figure 8:
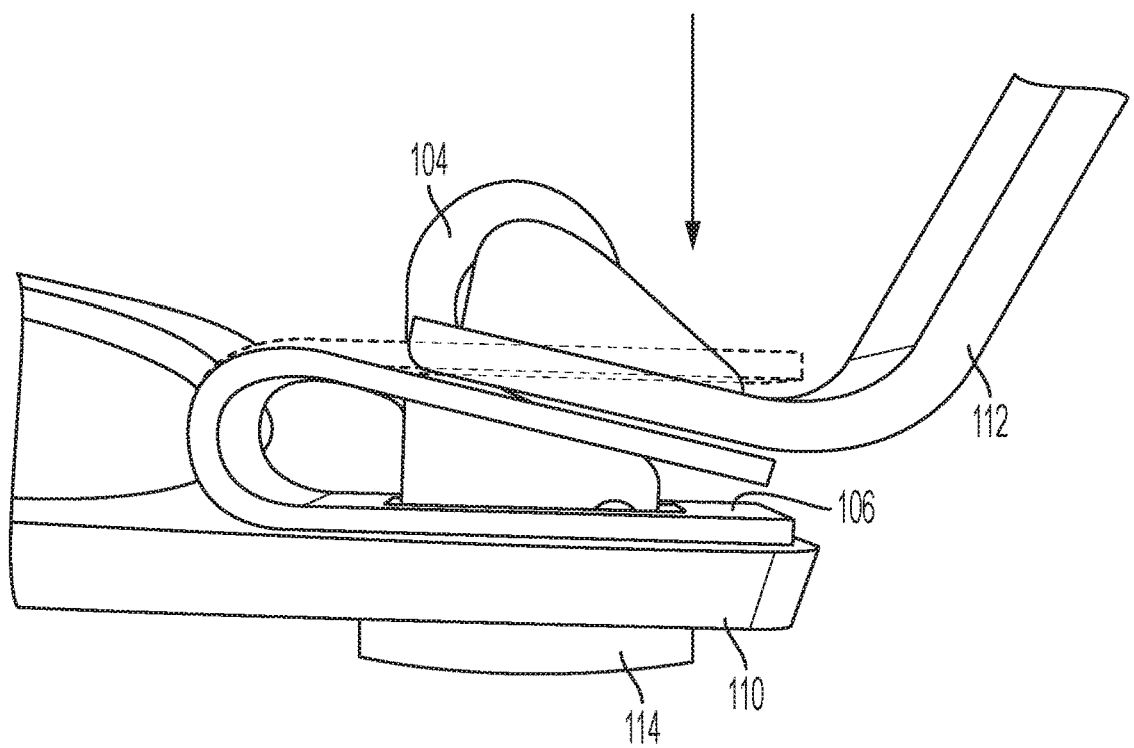
FIGS. 8 and 9 are enlarged side views of the screwless hinge of FIG. 7 in various stages of disassembly with the temple being removed according to various embodiments described below.
Figure 9:
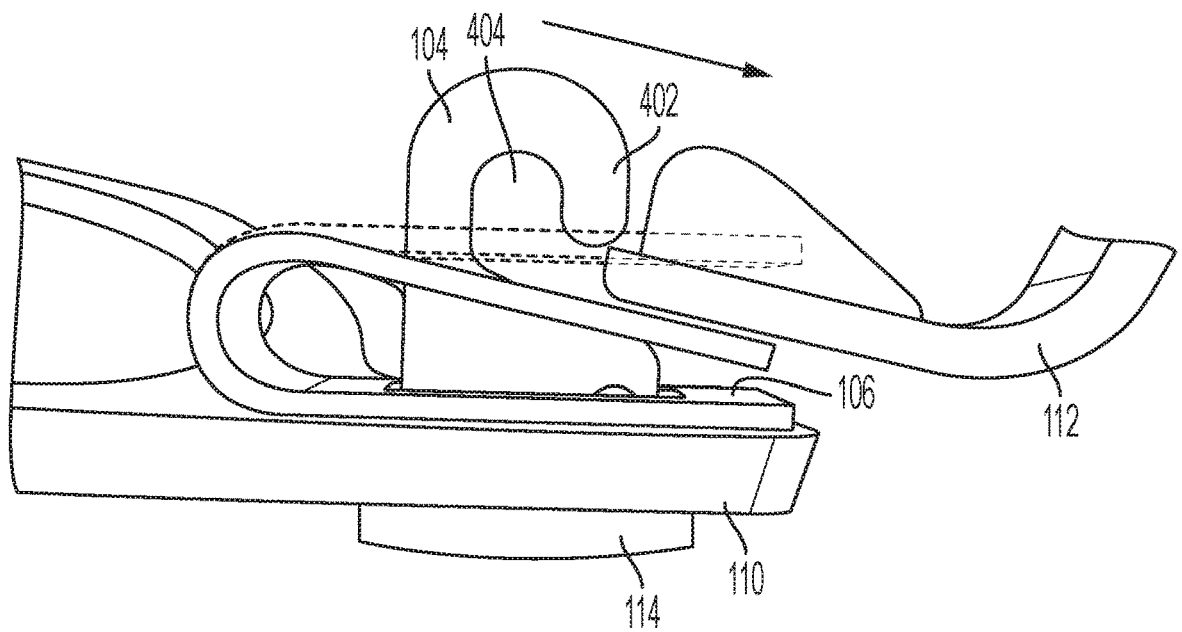

Turning now to FIGS. 6-9, FIG. 6 shows a perspective view of a screwless hinge 102, with FIG. 7 illustrating a side view of the same screwless hinge 102. FIGS. 8 and 9 are similar side views, illustrating the process of disassembling the screwless hinge 102, or removing the temple 112 from the front frame portion 110 according to various embodiments. The disassembly process begins at FIG. 8 with the user providing a downward force on the temple 112 as indicated by the large arrow. As seen, the downward force compresses the u-spring 106 to provide clearance for the span of the temple receiver 108 to clear underneath the end of the single hook 402 of the hooked tab 104. The broken lines represent the original, substantially uncompressed, configuration of the u-spring 106 to better illustrate the compression of the u-spring 106 from the applied force. To assist the compression of the u-spring 106, the user may rotate the temple 112 outward to apply force on the tip of the u-spring 106 and create a larger moment-arm for applying force that compresses the u-spring 106. The rotation of the temple 112 outward is not necessary, in fact the temple 112 may be rotated inward as well, but additional force may be required to sufficiently compress the u-spring 106. As seen in FIG. 9, once the appropriate clearance has been reached via compression of the u-spring 106, the temple receiver 108 and corresponding temple 112 may be removed from the screwless hinge 102 by pulling the temple receiver 108 and temple 112 outward as indicated by the arrow.

Figure 10:
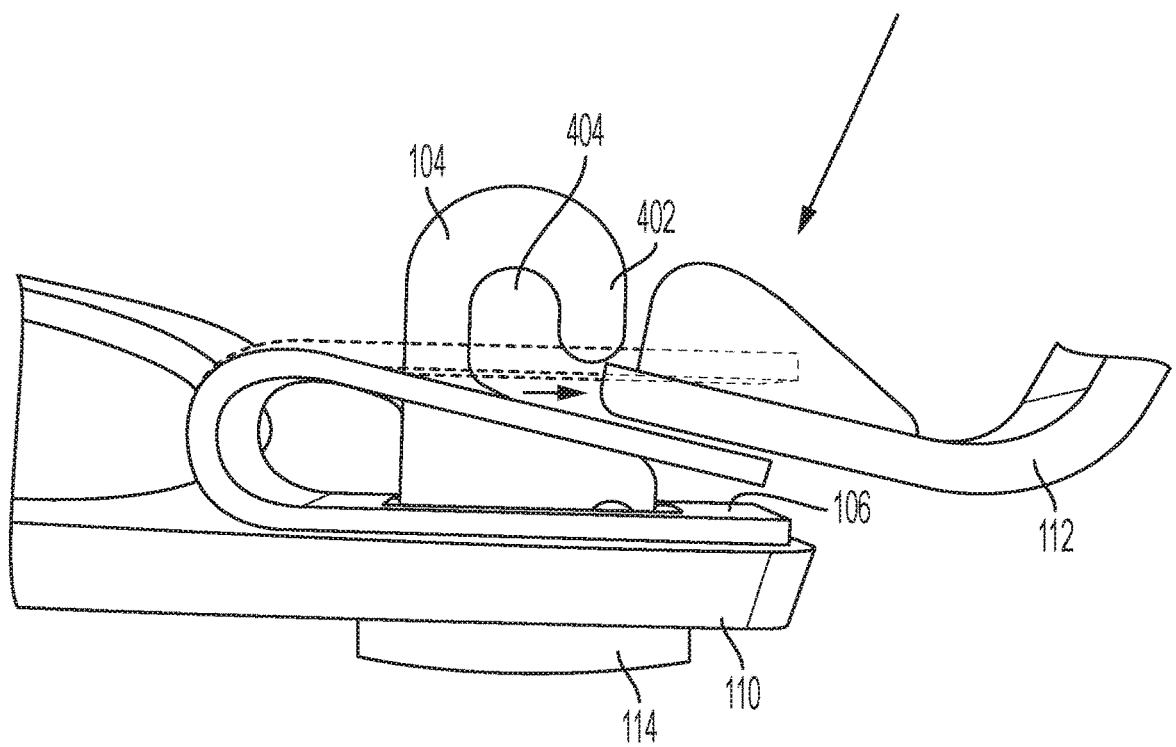
FIGS. 10 and 11 are enlarged side views of the screwless hinge of FIG. 7 in various stages of assembly with the temple being replaced according to various embodiments described below.
Figure 11:
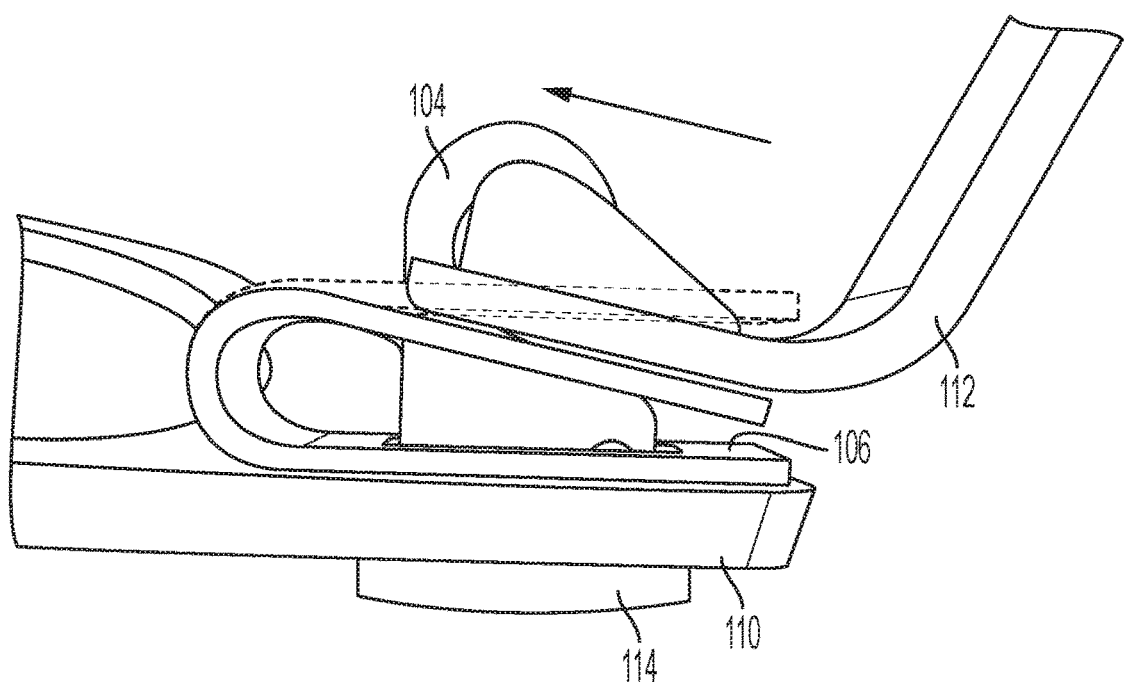
Figure 12:
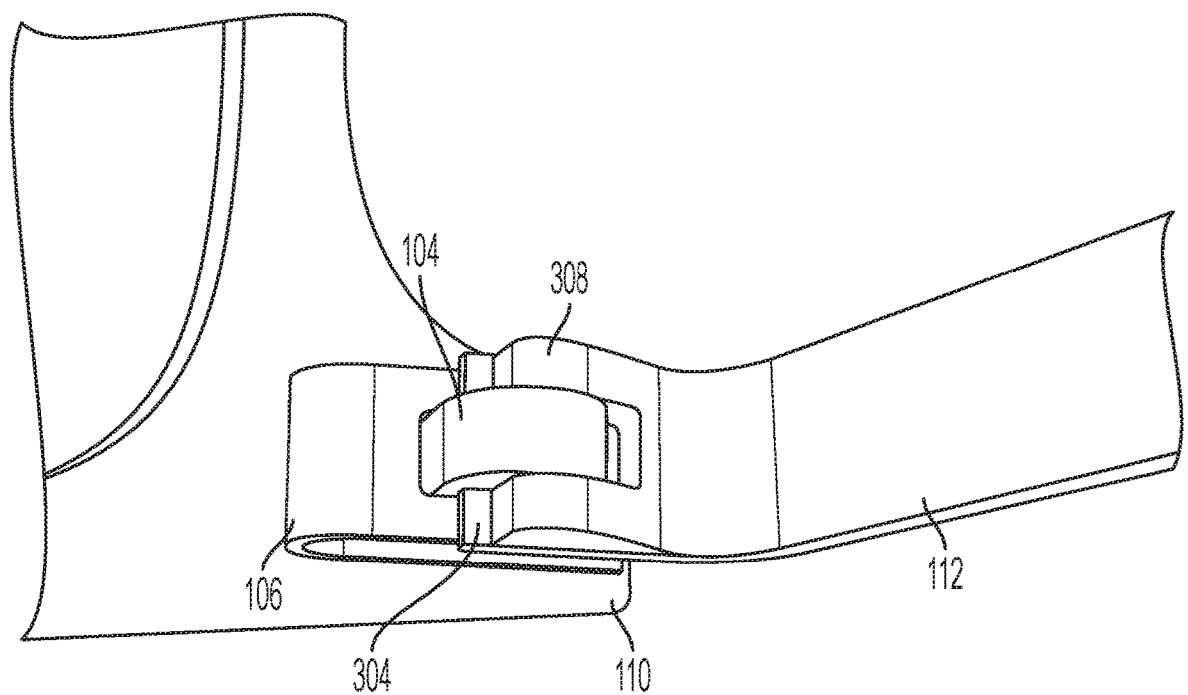
FIG. 12 is an alternative close-up perspective view of a screwless hinge according to various embodiments described below.

To replace the temple 112, FIG. 10 shows that the temple receiver 108 of the temple 112 is placed against the u-spring 106 and pressure is applied downward, as indicated by the large downward arrow, to compress the u-spring 106. Downward force should be applied until the u-spring 106 compresses enough to provide clearance between the span 302 of the temple receiver 108 and the tip of the hook of the hooked tab 104, the location of which is indicated with the short arrow. Once this clearance is obtained, FIG. 11 shows that an inward force applied to the temple 112 slides the temple receiver 108 inward under the hook of the hooked tab 104 and downward pressure may be released to fully engage the temple receiver 108 with the hooked tab 104, as seen in the perspective view of FIG. 12.

Figure 13:
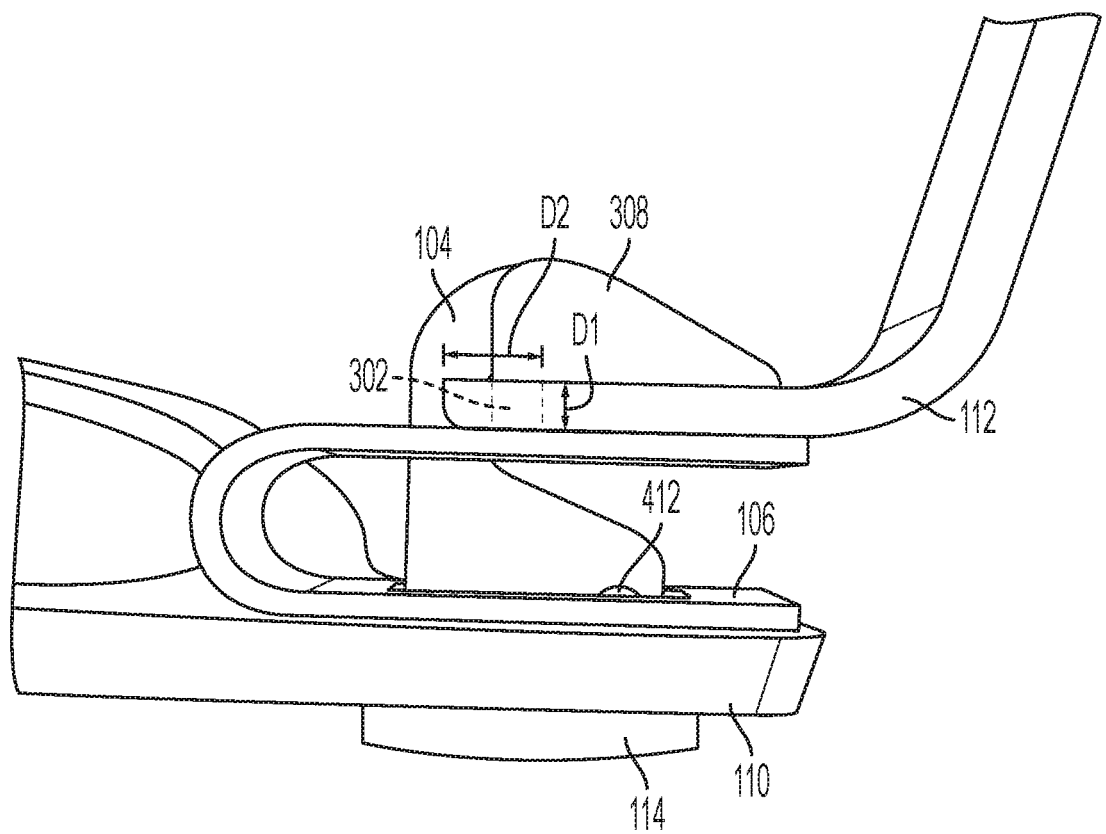
FIG. 13 is an enlarged view of a screwless hinge with the temple extended showing the substantially uncompressed u-spring according to various embodiments described below.
Figure 14:
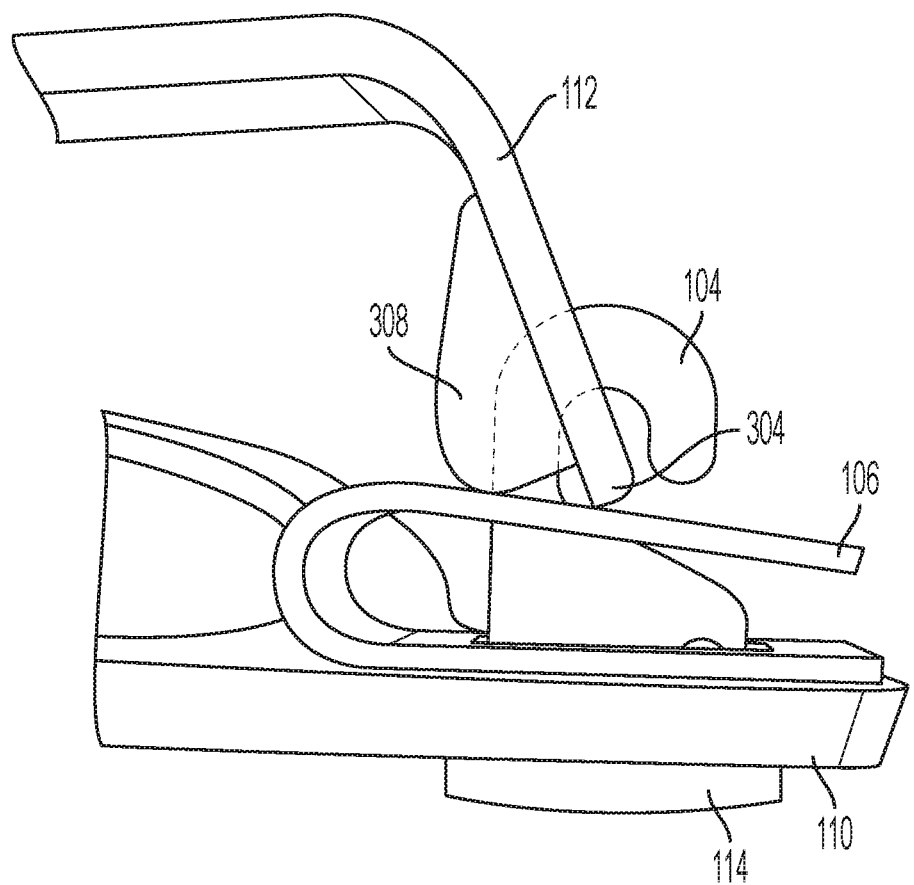
FIG. 14 is an enlarged view of a screwless hinge with the temple stowed showing the compressed u-spring according to various embodiments described below.

The u-spring 106 and the temple receiver 108 are designed to interact in a manner that provides a spring hinge-like effect without requiring an actual spring. For example, the transition between an open configuration with the temples 112 extending outward substantially perpendicular to the front frame portion 110 for use, as seen in FIG. 13, to a stowed or closed configuration with the temples 112 rotated inwards to a position substantially parallel with the front frame portion 110 when the eyewear is not in use, as seen in FIG. 14, will be discussed. According to various embodiments, the features of the screwless hinges 102 provide for a smooth transition between open and closed configurations with a force being applied by the u-spring 106 to bias the temple 112 in the open. As seen in FIG. 13, when the temple 112 is in the open configuration, a bottom surface of the temple receiver 108 abuts a top surface of the u-spring 106. The upward force of the u-spring 106 against the temple receiver 108 (due to slight compression of the u-spring 106 and/or relatively tight fit of components of the screwless hinge) into the hooked tab 104 holds the temple 112 in the open configuration. It should be noted that in the open configuration shown in FIG. 13, the u-spring 106 is substantially uncompressed, or rests in place with very little compression.

When the temple 112 is rotated toward the closed configuration, the temple receiver 108 rotates around the ends of the temple receiver sides 304 while the span 302 rotates within the hook opening 404 of the hooked tab 104. In doing so, the u-spring 106 is compressed downward, as seen in FIG. 14. The compression of the u-spring 106 is caused by the geometry of the temple receiver 108 and corresponding components.

Specifically, referring again to FIG. 13, the shortest linear distance D1 is defined herein as a distance between the top of the span 302 where the span 302 contacts the single hook 402 and the closest contact location of the temple receiver 108 with the u-spring 106. As seen in FIG. 13, distance D1 is substantially the height of the span 302 if the bottom of the span 302 contacts the top surface of the u-spring 106. D1 is effectively the separation distance between the top surface of the u-spring 106 and the top of the hook opening 404 since the temple receiver 108 fills this space and prevents the u-spring 106 from doing so. The shortest linear distance D2 is defined herein as a distance between the top of the span 302 where the span 302 contacts the single hook 402 when the temple 112 is in the closed configuration (as seen in FIG. 14) and the closest contact location of the temple receiver 108 with the u-spring 106 in the closed configuration, which is the length to the tip of the temple receiver sides 304. Because D2 is larger than D2 and the position of the single hook 402 is fixed, the u-spring 106 must compress when the temple 112 transitions to the closed configuration shown in FIG. 14.

FIG. 14 also shows the rotation stop 308 in contact with the u-spring 106 to prevent further rotation and/or to provide stability to the positioning of the temple 112 in the closed configuration. Because the u-spring 106 is at least partially compressed when the temple 112 is in the closed configuration, the u-spring 106 provides an upward force to the temple receiver 108 as the temple 112 transitions back from the closed configuration to the open configuration. After rotating the tip of the temple receiver sides 304 past a vertical position during transition to the open configuration, the upward force from the u-spring 106 acts to push or assist opening of the eyewear for use, biasing the temples 112 in the open configuration. In this manner, a user can easily and quickly "snap" the temples open for wearing from the stowed configuration.

Figure 15:
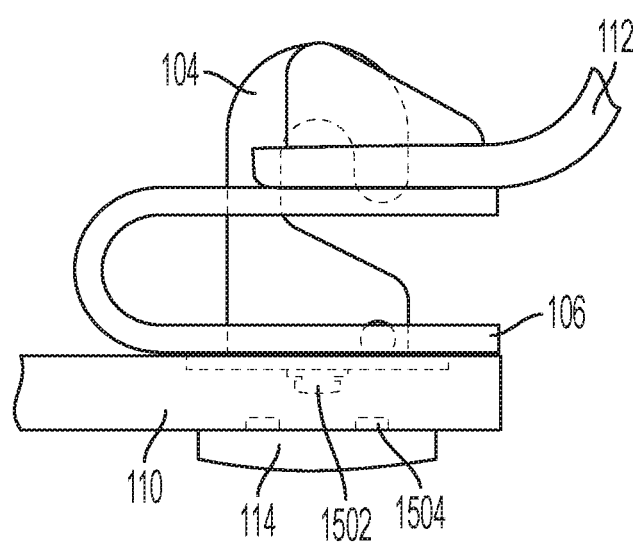
FIG. 15 is an enlarged perspective view of a screwless hinge having an embedded anchor according to various embodiments described below.

Turning now to FIG. 15, an alternative embodiment of the screwless hinge 102 will be discussed. The example shown in FIG. 15 may be utilized when the front frame portion 110 is injection molded or manufactured from acetate or any other material in which it may be desirable or advantageous to embed components within the frame material to secure the components to the front frame portion 110. In this embodiment, the hooked tab 104 and the base 114 are separate components. The front frame portion 110 does not have a hinge aperture through which the hooked tab 104 is inserted. Rather, the hooked tab 104 includes an anchor 1502 that is configured to be placed within the appropriate mold for embedding within the front frame portion 110 during creation of the front frame portion 110. The anchor 1502 may have any appropriate shape and dimensions for securing the hooked tab 104 within the material of the front frame portion 110.

Similarly, the base 114 may include anchor mechanisms 1504 for securing the base 114 to the front surface of the front frame portion 110. In this embodiment, the base 114 may be optionally coupled to the front frame portion 110 for aesthetic purposes. Similar to embodiments discussed above, the base 114 in this example may be made from metal, a form of plastic, or any desired material and may include one or more colors, patterns, or designs according to a desired look of the overall eyewear. The base 114 may be fixedly attached via adhesive, thermal welds, or any other suitable means. Anchor mechanisms 1504 and corresponding apertures or indentations within the front surface of the front frame portion 110 may facilitate coupling by providing an increased surface area for the adhesive. Alternatively, the base 114 may be removably attached via a friction fit of the anchor mechanisms 1504 with corresponding indentations within the front surface of the front frame portion 110, or via snaps or other suitable fasteners.

CONCLUSION

Many modifications and other embodiments of the disclosure will come to mind to one skilled in the art to which this disclosure pertains having the benefit of the teachings presented in the foregoing descriptions and the associated drawings. For example, as will be understood by one skilled in the relevant field in light of this disclosure, the embodiments may take form in a variety of different mechanical and operational configurations. Therefore, it is to be understood that the disclosure is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. A screwless hinge for operatively connecting a temple to a front frame portion of eyewear, the screwless hinge comprising:
   a hooked tab configured for coupling with the front frame portion of the eyewear to create an installed configuration, the hooked tab comprising:
      a single hook having a hook opening that is facing an outward direction away from a bridge of the front frame portion in the installed configuration, the single hook and hook opening configured to receive a span of a temple receiver of the temple to couple the temple to the front frame portion while allowing for rotation of the temple around the span,
a hooked tab retention mechanism; and
a u-spring comprising:
a substantially U shape with an opening that is facing the outward direction in the installed configuration, and
a first u-spring aperture and a second u-spring aperture, the first and second u-spring apertures positioned to receive the hooked tab and allow for the single hook to project at least partially through in the installed configuration, wherein the first u-spring aperture comprises a spring retention mechanism configured to engage the hooked tab retention mechanism to maintain the installed configuration.

2. The screwless hinge of claim 1, further comprising the temple receiver of the temple, the temple receiver comprising:
a pair of temple receiver sides, and
the span extending between the pair of temple receiver sides and configured to engage the single hook,
wherein a shortest first linear distance between a first contact location of the span with the single hook and a first contact location of the temple receiver with the u-spring when the temple is positioned in an open position is less than a shortest second linear distance between a second contact location of the span with the single hook and a second contact location of the temple receiver with the u-spring when the temple is positioned in a closed configuration.

3. The screwless hinge of claim 1, further comprising the temple receiver of the temple, the temple receiver configured such that when the temple is positioned in an open position, the u-spring is substantially uncompressed and when the temple is positioned in a closed configuration, the u-spring is at least partially compressed.

4. The screwless hinge of claim 1, further comprising the temple receiver of the temple, the temple receiver comprising at least one rotation stop projecting upward from at least one of a pair of temple receiver sides and configured to prevent rotation of the temple in a direction normal to a rotation of the temple around the hooked tab.

5. The screwless hinge of claim 1, wherein the hooked tab is configured for coupling with the front frame portion of the eyewear via insertion through a hinge aperture of the front frame portion to create the installed configuration, and wherein the hooked tab further comprises a base sized to prevent passage through the hinge aperture and to engage a front surface of the front frame portion in the installed configuration, wherein the base comprises a color or pattern visible from a front side of the front frame portion.

6. The screwless hinge of claim 5, wherein the base comprises a color or pattern visible from a front side of the front frame portion, and wherein the screwless hinge further comprises a plurality of hooked tabs, wherein each hooked tab is substantially identical in size and configuration such that each of the plurality of hooked tabs is interchangeable within the screwless hinge system with the other hooked tabs of the plurality of hooked tabs, and wherein each hooked tab of the plurality of hooked tabs comprises a base having a different color or pattern than the other hooked tabs of the plurality of hooked tabs.

7. The screwless hinge of claim 1, further comprising the temple receiver of the temple, the temple receiver comprising:
a pair of temple receiver sides, and
the span extending between the pair of temple receiver sides and configured to engage the single hook,
wherein the pair of temple receiver sides and the span define a temple aperture configured to receive an end of the single hook such that transition between open and closed configurations of the temple rotates the end of the single hook through the temple aperture.

8. The screwless hinge of claim 7, wherein the temple receiver is removable from engagement with the hooked tab via compression of the u-spring and linear translation of the temple receiver in the outward direction.

9. The screwless hinge of claim 7, wherein the temple receiver is configured to engage the hooked tab via compression of the u-spring and linear translation of the temple receiver in an inward direction toward the bridge and release of the u-spring until the span engages the single hook.

10. A screwless hinge system for operatively connecting a temple to a front frame portion of eyewear, the system comprising:
a hooked tab configured for insertion through a hinge aperture of the front frame portion of the eyewear to an installed configuration, the hooked tab comprising:
a single hook having a hook opening that is facing an outward direction away from a bridge of the front frame portion in the installed configuration, the single hook and hook opening configured to receive a span of a temple receiver of the temple to couple the temple to the front frame portion while allowing for rotation of the temple around the span, and
a base sized to prevent passage through the hinge aperture and to engage a front surface of the front frame portion in the installed configuration;
a u-spring comprising:
a substantially U shape with an opening that is facing the outward direction in the installed configuration, and
a first u-spring aperture and a second u-spring aperture, the first and second u-spring apertures positioned to receive the hooked tab and allow for the single hook to project at least partially through in the installed configuration; and
the temple receiver of the temple, comprising:
a pair of temple receiver sides,
the span extending between the pair of temple receiver sides and configured to engage the single hook, and
at least one rotation stop projecting away from a top surface of at least one of the pair of temple receiver sides and configured to prevent rotation of the temples in a direction normal to the rotation of the temple around the hooked tab,
wherein a shortest first linear distance between a first contact location of the span with the single hook and a first contact location of the temple receiver with the u-spring when the temple is positioned in an open position is less than a shortest second linear distance between a second contact location of the span with the single hook and a second contact location of the temple receiver with the u-spring when the temple is positioned in a closed configuration.

11. The screwless hinge system of claim 10, wherein the hooked tab comprises a hooked tab retention mechanism, and wherein the first u-spring aperture comprises a spring retention mechanism configured to engage the hooked tab retention mechanism to maintain the installed configuration.

12. The screwless hinge system of claim 10, wherein the temple receiver is configured such that when the temple is positioned in an open position, the u-spring is substantially uncompressed and when the temple is positioned in a closed configuration, the u-spring is at least partially compressed.

13. The screwless hinge system of claim 10, wherein the pair of temple receiver sides and the span define a temple aperture configured to receive an end of the single hook such that transition between open and closed configurations of the temple rotates the end of the single hook through the temple aperture.

14. The screwless hinge of claim 10, wherein the temple receiver is removable from engagement with the hooked tab via compression of the u-spring and linear translation of the temple receiver in the outward direction.

15. The screwless hinge of claim 10, wherein the temple receiver is configured to engage the hooked tab via compression of the u-spring and linear translation of the temple receiver in an inward direction toward the bridge and release of the u-spring until the span engages the single hook.

16. A screwless hinge for operatively connecting a temple to a front frame portion of eyewear, the screwless hinge comprising:
  a hooked tab configured for coupling with the front frame portion of the eyewear to create an installed configuration, the hooked tab comprising:
    a single hook having a hook opening that is facing an outward direction away from a bridge of the front frame portion in the installed configuration, the single hook and hook opening configured to receive a span of a temple receiver of the temple to couple the temple to the front frame portion while allowing for rotation of the temple around the span;
  a u-spring comprising:
    a substantially U shape with an opening that is facing the outward direction in the installed configuration, and
    a first u-spring aperture and a second u-spring aperture, the first and second u-spring apertures positioned to receive the hooked tab and allow for the single hook to project at least partially through in the installed configuration; and
  the temple receiver comprising:
    a pair of temple receiver sides, and
    the span extending between the pair of temple receiver sides and configured to engage the single hook,
    wherein a shortest first linear distance between a first contact location of the span with the single hook and a first contact location of the temple receiver with the u-spring when the temple is positioned in an open position is less than a shortest second linear distance between a second contact location of the span with the single hook and a second contact location of the temple receiver with the u-spring when the temple is positioned in a closed configuration.

17. The screwless hinge of claim 16, wherein the hooked tab is configured for coupling with the front frame portion of the eyewear via insertion through a hinge aperture of the front frame portion to create the installed configuration, and wherein the hooked tab further comprises a base sized to prevent passage through the hinge aperture and to engage a front surface of the front frame portion in the installed configuration, wherein the base comprises a color or pattern visible from a front side of the front frame portion.

18. The screwless hinge of claim 16, wherein the temple receiver is removable from engagement with the hooked tab via compression of the u-spring and linear translation of the temple receiver in the outward direction.

19. A screwless hinge system for operatively connecting a temple to a front frame portion of eyewear, the system comprising:
  a hooked tab configured for insertion through a hinge aperture of the front frame portion of the eyewear to an installed configuration, the hooked tab comprising:
    a single hook having a hook opening that is facing an outward direction away from a bridge of the front frame portion in the installed configuration, the single hook and hook opening configured to receive a span of a temple receiver of the temple to couple the temple to the front frame portion while allowing for rotation of the temple around the span,
    a base sized to prevent passage through the hinge aperture and to engage a front surface of the front frame portion in the installed configuration, and
    a hooked tab retention mechanism;
  a u-spring comprising:
    a substantially U shape with an opening that is facing the outward direction in the installed configuration, and
    a first u-spring aperture and a second u-spring aperture, the first and second u-spring apertures positioned to receive the hooked tab and allow for the single hook to project at least partially through in the installed configuration,
    wherein the first u-spring aperture comprises a spring retention mechanism configured to engage the hooked tab retention mechanism to maintain the installed configuration; and
  the temple receiver of the temple, comprising:
    a pair of temple receiver sides,
    the span extending between the pair of temple receiver sides and configured to engage the single hook, and
    at least one rotation stop projecting away from a top surface of at least one of the pair of temple receiver sides and configured to prevent rotation of the temples in a direction normal to the rotation of the temple around the hooked tab.

20. The screwless hinge of claim 19, wherein the temple receiver is removable from engagement with the hooked tab via compression of the u-spring and linear translation of the temple receiver in the outward direction.

* * * * *